(No Model.) 2 Sheets—Sheet 1.

G. T. NEWHALL.
VEHICLE.

No. 428,815. Patented May 27, 1890.

Witnesses
Joseph H. Greenleaf
Joseph Sheldon.

Inventor
George T. Newhall
By George B. Barnes,
Attorney (No Model.) 2 Sheets—Sheet 2.
G. T. NEWHALL.
VEHICLE.
No. 428,815. Patented May 27, 1890.
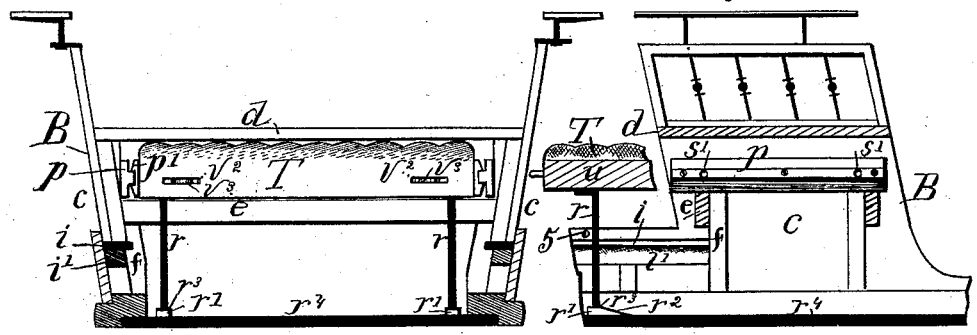
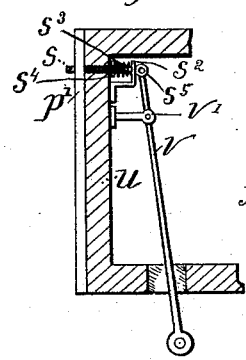
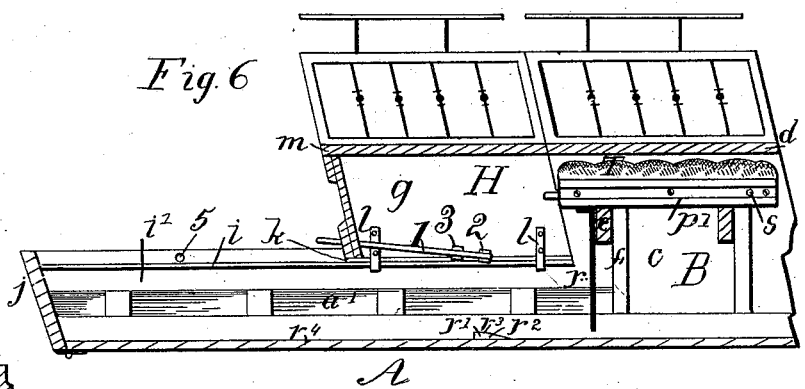
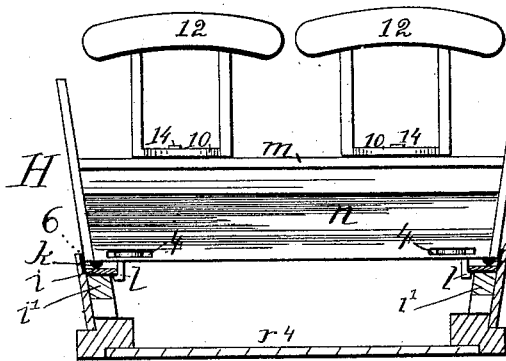
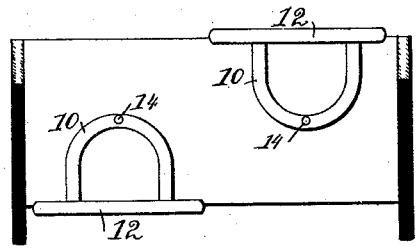
Witnesses
Joseph H. Greenleaf
Joseph Sheldon.
Inventor
George T. Newhall.
By George L. Barnes
Attorney

UNITED STATES PATENT OFFICE.

GEORGE T. NEWHALL, OF NEW HAVEN, CONNECTICUT.

VEHICLE.

SPECIFICATION forming part of Letters Patent No. 428,815, dated May 27, 1890.

Application filed March 17, 1890. Serial No. 344,169. (No model.)

*To all whom it may concern:*

Be it known that I, GEORGE T. NEWHALL, a citizen of the United States, residing at New Haven, in the town of New Haven and State of Connecticut, have invented a new and useful Improvement in Vehicles, of which the following is a specification.

My invention relates to vehicles, and has for its object primarily to provide a double-seated vehicle in which the rear or sliding seat is adapted to be moved forward and joined to the front or fixed seat to form therewith a continuous or apparently entire "body," and with the rear back reversed to constitute a "dos-à-dos," as carriages are called in which two seats are located back to back.

A further object is to provide a third sliding seat beneath or within the front or fixed seat, which may be withdrawn to form a dos-à-dos with the front seat when the rear or sliding seat is "set back" or removed, whereby the vehicle may be readily adapted as a one, two, or three-seated conveyance or dos-à-dos in two styles and retain in each modification strength, simplicity, convenience, and elegance of design.

The invention consists in the novel construction, arrangement, and combination of the seats, and means for operating and securing them, as hereinafter more fully described and claimed.

Figure 1:
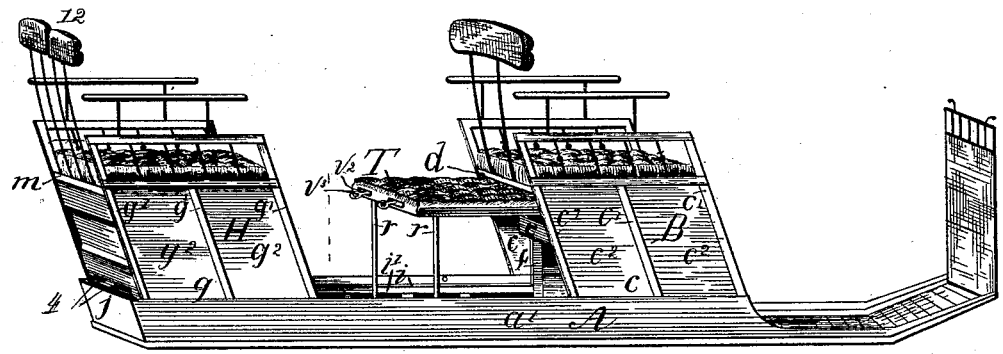
Figure 2:
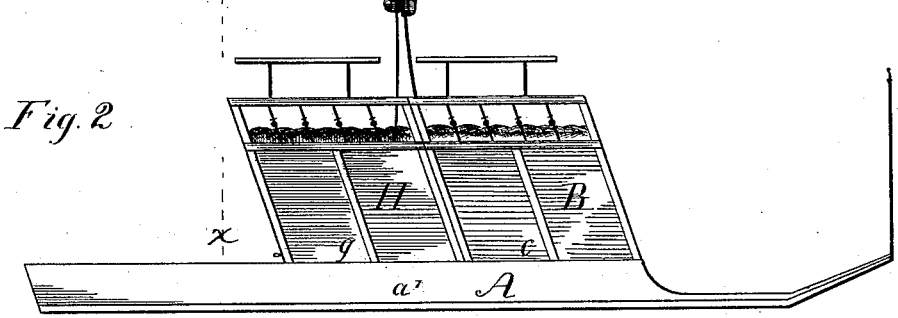
Figure 3:
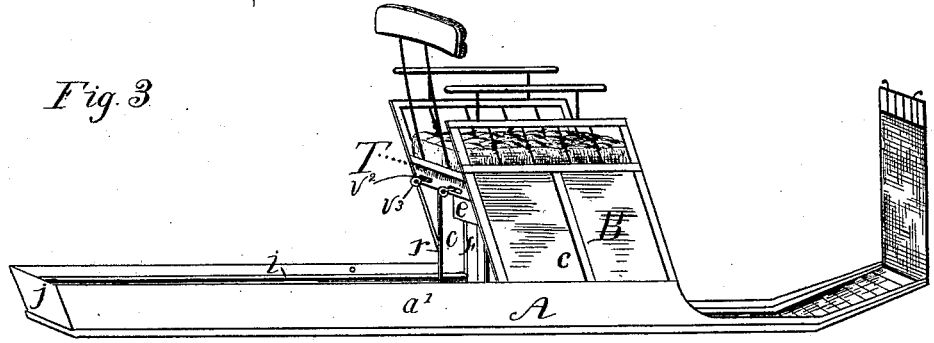

In the accompanying drawings, forming a part of this specification, Figure 1 is a perspective view of the body and seats of my improved vehicle with the seats arranged to constitute a "triple-seat" conveyance. Fig. 2 is a side elevation of the same adapted as a dos-à-dos-seated vehicle, formed by joining the rear seat to the front seat as a part thereof, and reversing the back of the rear seat. Fig. 3 is a perspective view of the body and fixed seat, with the sliding seat beneath the fixed seat inserted or moved in out of use. Fig. 4 is a rear view of a vertical cross-section on the line $x$, Fig. 2; and Fig. 5 is a central vertical lengthwise section of the fixed seat, with the small sliding seat shown in part. Fig. 6 is a central vertical lengthwise section showing both of the main seats in juxtaposition and the small sliding seat inserted and shown in elevation. Fig. 7 is a horizontal section of the frame of the small sliding seat, showing the mechanism for securing the seat in place. Fig. 8 is a vertical cross-section on the line $x$, Fig. 2, showing a rear view of the rear seat; and Fig. 9 is a plan view of the rear seat, showing the reversible action of the backs.

Referring to the drawings, A designates the body of my improved vehicle, and B is the front or forward seat, which is formed integral with and constitutes a part of the body, the ends C, which consist of the uprights C' and panels $C^2$, being secured to or built up from the sides $a'$ of the body. The said ends preferably lean rearward or are made raking to insure elegance of design, and they support the bed or cross-plank $d$ of the seat, which is firmly secured to them. A tie or strip $e$, extended across under the said cross-plank and fastened to suitable cleats F on the inner sides of the ends C, further strengthens the structure and holds the said ends from spreading, as they are set "flaring" or with their tops farther apart than the sides $a'$ of the vehicle-body, as shown.

Secured upon the frames $i'$ of the sides of the body are suitable ways or rails $i$, extending from the stationary seat B rearwardly therefrom to the end of the body A and projecting slightly over the inner edges of the said frames. The rear seat H is mounted upon and adapted to be moved along the said ways or rails $i$, being suitably shod with iron bearings $k$, which rest on the rails, and provided with depending hooks or lugs $l$, which engage with or hook under the inner edges of the ways $i$ to prevent the seat from being lifted or tipped therefrom.

The rear seat is of the same design as the forward seat, having for its ends $g$ the uprights $g'$ and panels $g^2$, corresponding to the uprights and panels of the forward seat. The said ends $g$ are arranged in the same longitudinal plane with the ends of the stationary seat and with the same "flare" and "rake," and their forward edges are formed to correspond to and adapted to match with and fit snugly against the rear edges of the forward seat when moved forward into juxtaposition therewith to present a continuation thereof, both seats forming when thus jointed together and locked in engagement, as hereinafter described, a continuous dos-à-dos "box-seat," apparently constituting an entire and integral "box," built up from the low straight body A.

The ends $g$ of the rear seat support and are connected by a cross-plank or seat $m$ and are further tied together and stayed by boarding $n$, built across them near their rear edges to close in the space under the seat from the rear and give a finished appearance to the structure.

The ways $i$, before mentioned, extend from the rear end of the body to the forward seat, and thus the rear seat may be moved along them from the forward seat to the extreme end of the vehicle or entirely removed therefrom, the end-board $j$ being hinged to the body in the usual manner and adapted to be swung or let down out of the horizontal plane thereof.

Under the cross-plank $d$ of the forward seat, firmly secured to the inner sides of the ends $c$, are metal ways or ribs $p$, upon which a small seat T is arranged to slide, having secured upon its ends suitable metal ways or grooves $p'$, fitting the said ribs $p$, the seat thus being adapted to be moved in entirely under the forward seat or drawn out to form a dos-à-dos therewith, as required. Suitable legs $r$ depend from the lower side of the rear part of the seat T to support it when withdrawn in position to be used, and metal bearings $r'$ are secured to the floor $r^4$ of the vehicle for the legs to rest on when in said position, the bearings having inclined surfaces $r^2$ over a part of their length for the feet of the legs to slide up over to reach the high level part $r^3$ of the bearing, where they remain when wholly withdrawn. These devices insure the firm support of the seat when in use, while permitting it to be readily moved into and out of position with minimum friction.

To hold the seat T firmly in place, either when moved in under the forward seat or withdrawn for use, a spring-actuated bolt $s$ is arranged through each of the ways or grooves $p'$ and frame $u$ of the seat, as fully shown in Fig. 7, and adapted to spring into or engage corresponding notches or seats $s'$, suitably located in the ribs $p$ in position to receive the bolts when the seat is at either extremity of its travel. Each bolt is guided at its inner end by a bracket $s^2$, secured to the frame, and the actuating coil-spring $s^3$ is received upon the bolt between the bracket and the frame, a pin $s^4$ being fastened through the bolt to receive the thrust of the spring to impel the bolt outward, the bracket sustaining the force or reaction of the spring in the opposite direction. A lever $v$ is pivoted or hinged to the inner end $s^5$ of each bolt and fulcrumed or pivotally supported on a standard $v'$, fastened to the frame $u$, and both of the said levers pass out through slots $v^2$ in the rear side of the frame and terminate in suitable handles $v^3$, by which the levers may be grasped to disengage the bolts from their seats and draw out the sliding seat into position or push it forward under the seat B, as required.

The rear or movable seat H is also secured in position by means of mechanism similar to that above described for holding the seat T in place. A lever 1, spring-actuated bolt 2, and standard 3 are arranged on the inner side of each of the ends $g$ of the rear seat H, precisely as they are shown in Fig. 7, the frame $u$ in said figure corresponding or being analogous to the ends $g$ of the seat H, and boarding $n$ thereof connecting said ends. The levers 1 pass out rearwardly through slots 4 in the boarding $n$, and may be grasped to operate the bolts and move the seats. The bolts of the rear seat engage or shoot into suitable holes or seats 5 in the upper edges of the sides $a'$ of the body A, the forward hole being located so that it receives the bolt when the seat is joined to or is in juxtaposition with the forward fixed seat B, and the rear hole is placed to hold the seat in its rearmost position. The said holes 5 may be suitably bushed to prevent the wear of the wood by the bolts, or thin strips of iron 6 may be fastened to the boarding $a'$ on the inside and above the ways $i$, the said holes being drilled through the iron strips, which will prevent the wear or splitting off of the board, and is the preferred construction.

The back of the rear seat H is made double or in two parts, each part consisting of a U-shaped strip 10 of spring-steel pivoted to the seat at the center of the bend of the U by a bolt or screw 14 and having the straight parts of the U bent upward, with the back 12 secured to their upper ends, as shown in Figs. 8 and 9, which construction readily permits the backs to be reversed for the purpose of forming a rearwardly-facing seat.

The construction of my improved vehicle, as described, will be seen to insure convenience in the arrangement of the seats and adaptability to the various requirements of use.

The rear seat may be set back adjacent to the end board to adapt the vehicle as an ordinary two-seated conveyance, and while in such position, if the small sliding seat be withdrawn, a triple-seat vehicle is formed, the small seat comprising a "dos-à-dos" with the forward seat, as shown in Fig. 1.

With the rear seat removed, a "dos-à-dos" of the forward seat and the sliding seat remains, and the sliding seat may be moved in to form a plain business wagon, as shown in Fig. 3.

An important modification is provided by sliding the rear or movable seat H forward against or in contact with the fixed seat and securing it in that position as an apparent "matched" continuation of the fixed seat or integral structure therewith, so that the seats together thus appear to form the main part of the body of the vehicle, and thus comprise, with the back of the rear seat reversed, a dos- à-dos wagon of handsome, strong, and efficient design, which may be changed at pleasure into any of the modifications described, as required.

I claim and desire to secure by Letters Patent—

1. In a vehicle, the combination, with the body having the low parallel flaring sides, a stationary box-seat having its ends built up integrally with the said sides of the body, with corresponding flare and raking or leaning rearwardly, longitudinal tracks or ways on the said sides of the body adjacent to the upper edges thereof and extending rearwardly from the stationary seat to the end of the body, a rear movable seat provided with a reversible back and fitted and adapted to slide upon the said tracks or ways, having its ends in the lengthwise plane of the ends of the forward seat, with the front edges thereof formed to correspond to and adapted to match with and fit snugly against the rear edges of the ends of the forward seat, substantially in continuation thereof, and adapted to form therewith a continuous dos-à-dos box-seat or to be moved rearwardly to form a double-seated vehicle, and the spring-actuated bolts or stops for retaining the said movable rear seat in engagement with the stationary seat to form a continuous dos-à-dos box-seat therewith, substantially as specified.

2. In a vehicle, the combination, with the body having the low parallel sides, a stationary box-seat having its ends built up integral with the said sides of the body, forming a rearwardly-opening chamber beneath the seat, horizontal guides secured on the inner sides of the said ends, a sliding seat fitted and adapted to slide upon the said guides into the chamber beneath the said stationary seat or to be drawn rearwardly to form a dos-à-dos seat therewith, longitudinal tracks or ways on the said sides of the body adjacent to the upper edges thereof and extending rearwardly from the stationary seat, a rear movable seat provided with a reversible back and fitted and adapted to slide upon the said tracks or ways, having its ends in the lengthwise plane of the ends of the forward seat, with the front edges thereof formed to correspond to and adapted to match with and fit against the rear edges of the ends of the forward seat, substantially in continuation thereof, and adapted to form therewith a continuous dos-à-dos box-seat or to be moved rearwardly to form a double or triple seated vehicle, and suitable stops, catches, or engaging-bolts for retaining the said movable rear seat in engagement with the stationary seat to form a continuous dos-à-dos box-seat therewith, substantially as specified.

3. In a vehicle, the combination of the fixed seat "built up" or secured to the vehicle-body, horizontal guides or ways secured on the inner sides of the ends of the seat and having the bolt-sockets therein, a sliding seat arranged to fit beneath the fixed seat and provided with guides or ways fitting and adapted to slide upon the said fixed guides, spring-actuated bolts or catches arranged on the sliding seat and adapted to engage or spring into the said fixed sockets when the sliding seat is in its forward or rear positions, and rearwardly-projecting operating-levers connected to the said bolts and adapted to disengage them from the said sockets and serve as handles for adjusting the seat, as specified.

4. In a vehicle, the combination of the fixed seat built up or secured to the vehicle-body, horizontal guides or ways secured on the inner sides of the ends of the seat and having the bolt-sockets therein, the sliding seat T, provided with guides or ways fitting the said fixed guides and adapted to slide thereon, the spring-actuated bolts or catches $s$, arranged on the sliding seat, the sockets $s'$ for receiving the bolts, the operating-levers $v$ for disengaging the bolts and handily moving the the sliding-seat legs or supports $r$, depending from the sliding seat to support it when withdrawn, and the inclined bearings $r'$, secured to the floor of the vehicle and adapted to serve as a bearing for the said supports when the seat is withdrawn, all arranged substantially as and for the purpose described.

GEO. T. NEWHALL.

Witnesses:
SOLOMON MEAD,
JOSEPH SHELDON.